June 7, 1960  W. L. PROBERT  2,940,038
SPEED-TORQUE INDICATOR
Filed June 11, 1956  3 Sheets-Sheet 2
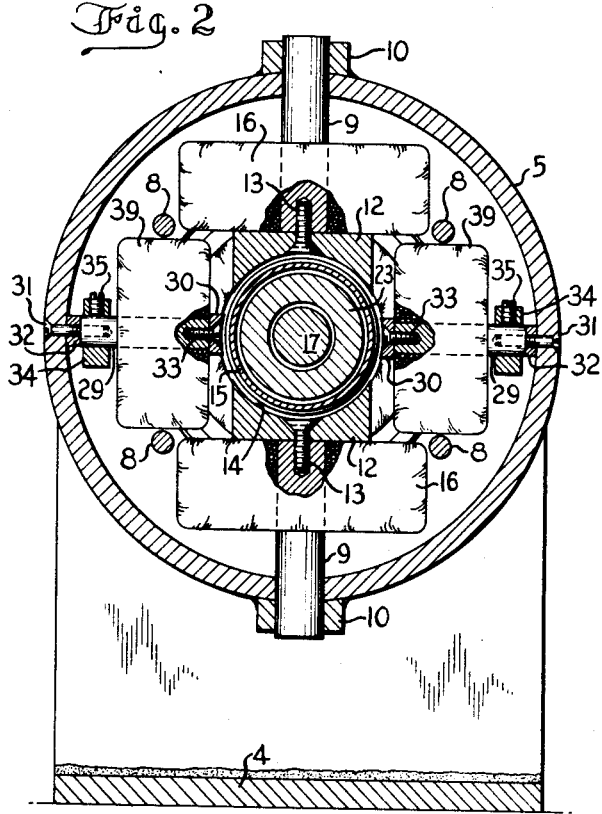
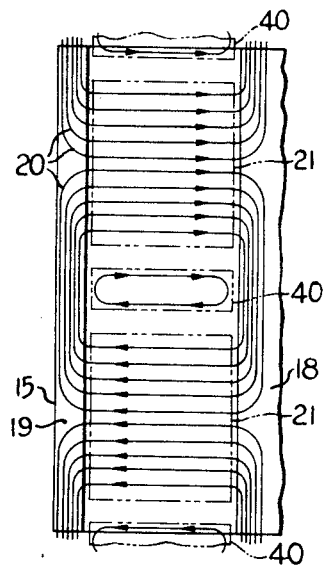
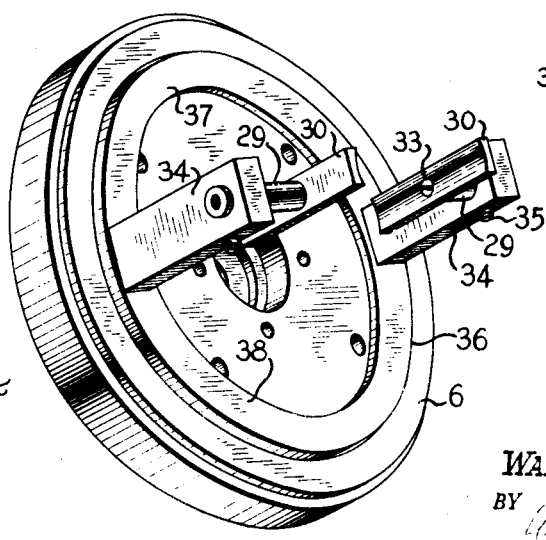
INVENTOR.
WALTER L. PROBERT
BY
Attorneys June 7, 1960 W. L. PROBERT 2,940,038
SPEED-TORQUE INDICATOR
Filed June 11, 1956 3 Sheets-Sheet 3
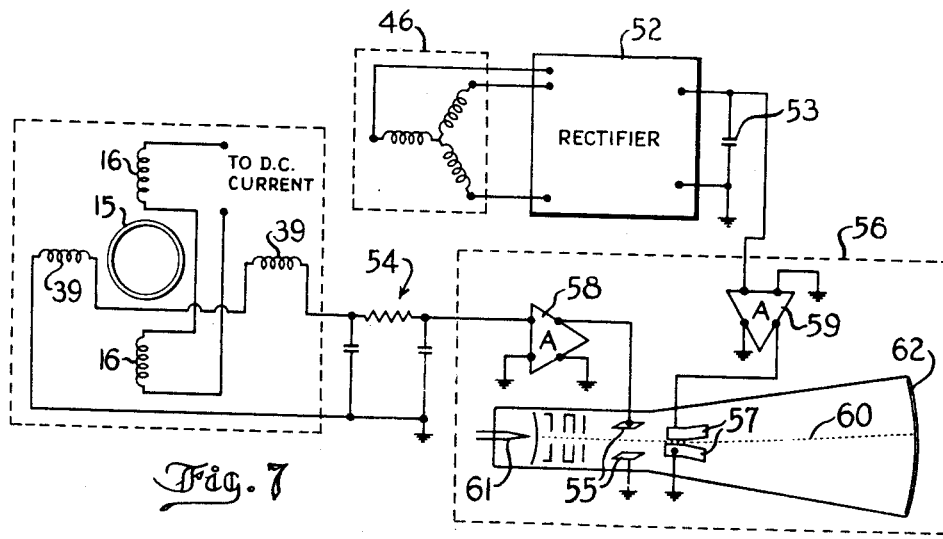
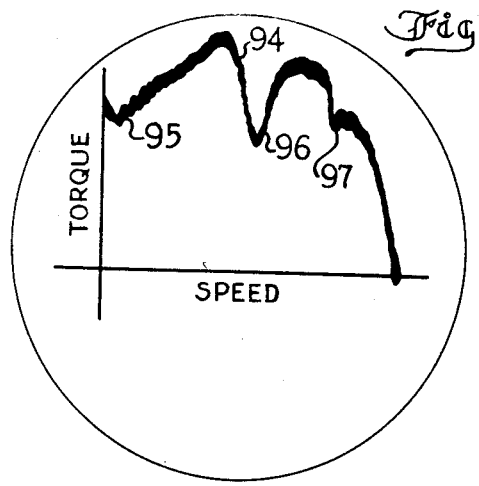
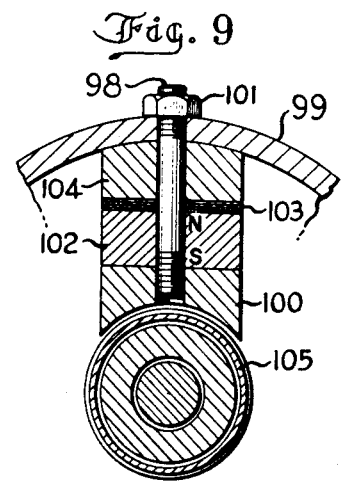
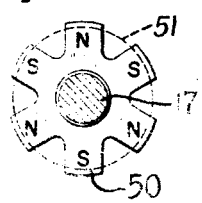
INVENTOR.
WALTER L. PROBERT
BY
Attorneys United States Patent Office 2,940,038
Patented June 7, 1960

2,940,038

SPEED-TORQUE INDICATOR

Walter L. Probert, Milwaukee, Wis., assignor to A. O. Smith Corporation, Milwaukee, Wis., a corporation of New York Filed June 11, 1956, Ser. No. 590,627

11 Claims. (Cl. 324—70)

This invention relates to apparatus for detecting the rate of acceleration of rotating equipment and particularly for giving a direct record of the associated speed-torque characteristic of rotating equipment such as motors.

In a motor, the speed-torque characteristics are a result of the particular design parameters of the motor components as well as the physical state thereof. Therefore, by determining the speed-torque characteristic, it is possible to locate a component of inferior design; for example, the following are some of the inferior features, if present in the motor, which will be recognized: poor heat treatment of the rotor, incorrect bar skew or bar-slot combination and in a single phase motor, erratic switching.

The speed-torque characteristic can be determined by plotting, point by point, the result of a series of load tests. This method is very tedious and inherently is only as accurate as the operator running the tests and plotting the curve. Naturally, depending on manual operation, it is also quite expensive.

In the alternative, certain electrical apparatus has been suggested for automatically recording a trace of the characteristic, usually being shown on an oscilloscope.

Presently, speed-torque determining apparatus employs an electrical signal usually in the form of a voltage which is proportional to the speed of the rotating equipment. To obtain a voltage proportional to the acceleration and therefore the torque, the signal is passed through suitable electronic differentiating and amplifying circuits. Normally, the output of the differentiating circuit includes stray interference voltages. This results from the normal use of tachometer generators to obtain the signal and also from inductive and capacitive coupling in the amplifying and differentiating circuits. Inherent nonlinear characteristics and tube noise in the amplifiers is also a source of interference voltages. These units are also quite expensive.

The present invention provides apparatus for direct determination of acceleration without the use of the conventional differentiating circuit in which much of the interference voltages are established and/or are multiplied. The necessity of specially electronically amplifying the signal is eliminated which removes another principal source of distortion. Further, in eliminating the tachometer generator for the acceleration voltage, the inherent noise and maintenance of brushes is eliminated. Brush friction which is a load on the motor under test is also eliminated.

In accordance with the present invention, a tubular member of cylindrical shape is coupled to the rotating equipment and driven thereby within a constant magnetic field. An induced current is set up within the tubular member which varies directly with the speed of rotation of the tubular member and consequently the rotating equipment. The flux set up by the induced current is directed through a signal coil to induce a voltage proportional to the rate of flux change. This signal is then proportional to the acceleration of the rotating equipment and as the torque available is proportional to the acceleration; this signal is employed to provide a record of the torque. To provide a more satisfactory record of the torque, the field poles carrying the stationary flux winding are provided with a large face area and the pickup poles are provided with a relatively small face area to minimize the armature reaction and the effect thereof on the signal.

The drawings furnished herewith illustrate the best mode presently contemplated for carrying out the invention.

In the drawings:

Fig. 2 is a sectional view taken on line 2—2 of Figure 1;

Fig. 3 is a developed view of a rotor with a schematic current pattern as obtained in the embodiment of Figure 1;

Fig. 4 is a view in perspective of the front cover shown in Figure 1;

Fig. 5 is a diagrammatic illustration of the flux established in the described embodiment of the invention.

Fig. 6 is an elevational view of a portion of the speed indicating apparatus;

Fig. 7 is a schematic electric circuit of the illustrated embodiment;

Fig. 8 is a diagrammatic showing of a speed-torque curve; and

Fig. 9 is a fragmentary view of a portion of another embodiment of the invention.

Figure 1:
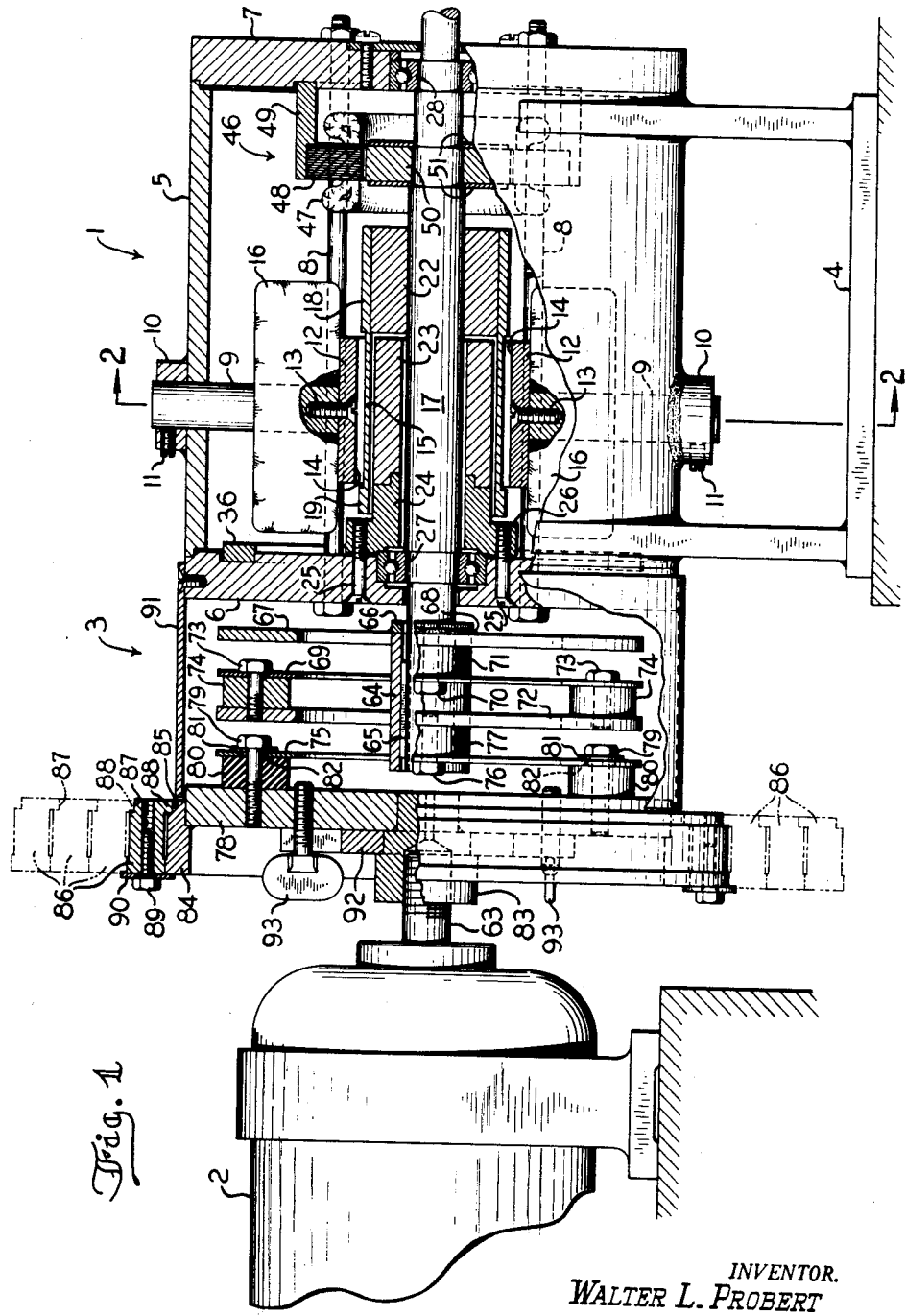
Figure 1 is an elevational view of an embodiment of the invention, with parts broken away and sectioned.

Referring in particular to Figure 1, a speed-torque tester 1 is coupled to a motor 2 by a coupling 3. The motor 2 is to be tested to determine its speed-torque characteristic.

The tester 1 comprises a base member 4 supporting a hollow cylindrical frame and yoke 5 which is closed by a front cover 6 and a rear cover 7 attached to the frame 5 by a plurality of tie bolts 8. A north and a south magnetic pole structure is secured to opposed points of the frame 5 and a main magnetic field established therebetween. As shown in Figs. 1 and 2, each pole structure includes a cylindrical shank 9 which extends through an aperture in the frame 5 and an aligned embossment 10 which is welded or otherwise securely attached to or formed with the frame. A set screw 11 extends through a tapped lateral opening in each embossment 10 and bears against the outer end of the associated shank 9 to securely hold the pole members, magnetically connected to the yoke 5.

A pole tip 12 is secured, one to each of the inner ends of the shanks 9, by screws 13 which extend through the associated pole tip and into suitably tapped openings in the center of the respective shank 9. Each pole tip 12 is provided with a cylindrically recessed face 14 to conform to the outer surface of a tubular rotor 15 of cylindrical cross-section and thereby provide a uniform air gap therebetween. A field winding composed of a pair of field coils 16, wound one on each of the shanks 9 of the magnetic pole members, provides a magnetic field between the pole tips.

The tubular rotor 15 is rotatably supported by a shaft 17 between the pole tips 12 and cuts the magnetic field therebetween whereby an axial flow of induced current is established in the rotor in accordance with conventional magnetic theory. The ends of the rotor 15 extend axially to each side of the pole tips 12 and are enlarged as at 18 and 19 to reduce the resistance of the end sections and provide a better current distribution.

The induced current distribution in the rotor 15 is more clearly shown in Fig. 3 which is a developed view of the rotor 15 and more fully described hereinafter. The illustrated induced current as shown by the solid lines 20 is for a projection of the pole faces 14 as shown by dotted lines 21 and for a main flux which enters the rotor 15 from the lower pole face of Fig. 3 and leaves the rotor through the upper pole face of Fig. 3.

A suitable material for the rotor 15 is brass which has a high strength and a relatively low resistivity. The low resistivity minimizes the power losses in the rotor and reduces the flux density necessary to produce any given current. Therefore, rotor drag torque, which is directly proportional to the flux for a given current, is minimized.

Rotor 15 is secured in spaced, concentric relation to the shaft 17 by a non-magnetic sleeve 22 which is secured, as by a force fit, respectively to the inner periphery of one end of the rotor 15 and to the outer periphery of the shaft 17. The non-magnetic support sleeve 22 prevents excessive stray flux which may superimpose an interference signal on the speed versus torque signal.

The main magnetic field is concentrated between the pole tips 12 by a stationary magnetic core 23 which is secured in the annular space between the rotor 15 and the shaft 17 which results from the use of spacing sleeve 22. The magnetic core 23 is tubular shaped and held in slightly spaced relation to the shaft and to the rotor by a non-magnetic brace member 24 extending from the front end cover 6. The magnetic core 23 is brazed or otherwise securely attached to the brace member 24. The latter is secured to the front cover 6 by a plurality of set screws 25 which extend through the front end cover 6 and threaded into tapped openings in a flange 26 formed on the brace member.

The shaft 17 is journaled for rotation in the center of the front cover 6 and the rear cover 7. Each cover has a suitable bearing 27 and 28, respectively.

As the rotor 15 is driven through the gap between the pole faces 14 and the stationary core 23, it cuts the flux concentrated thereacross and a current flow is set up in the rotor 15, as more clearly shown in Fig. 3. This current flow is the result of a voltage induced between the ends of the rotor lying beneath the pole faces. The voltage induced in the rotor adjacent each pole is in opposite direction to that in the opposite pole such that a current pattern is formed in the rotor as shown in Fig. 3.

This current results in a magnetomotive force which establishes a signal magnetic field or cross flux which is at ninety degrees to the main field or flux. This signal field is proportional to the magnetomotive force with the permeance of a signal magnetic path, presently described, being a constant of proportionality.

As shown in Figs. 2 and 4, a pair of signal poles 29 are disposed one to each side of the rotor 15 and are rotated ninety degrees from the main field poles. Each pole 29 is provided with a pole tip 30 secured in slightly spaced radial relation to the rotor 15. Each signal pole 29 is secured to the frame 5 by a non-magnetic screw 31 which passes through an opening in the frame and threads into a suitable tapped opening in the associated pole. Non-magnetic spacers 32 are disposed between the end of the respective poles 29 and the frame 5 to prevent a magnetic circuit therebetween. This maintains the signal magnetic path separate from the main magnetic path.

The pole tips 30 are the same length as the main pole tips 12, but are of a relatively narrow circumferential width. Pole tips 30 are secured to the corresponding signal pole by a set screw 33 extending through the associated pole tip and threading into a tapped opening in the corresponding pole. The face of the pole tips 30 are curved to agree with the curvature of the rotor 15 in the conventional manner.

As more clearly illustrated in Fig. 4, the signal poles 29 are each supported to one end of support members 34 and extend axially inwardly from diametrically opposite points of the inner face of front end cover 6. As more clearly shown in Fig. 2, a set screw 35 threads into a tapped opening in each support member 34 and bear on the adjacent signal pole to secure it within an opening in the support member.

Each support member 34 is secured to the front end cover as by set screws, not shown, which extend therethrough and which thread into a tapped aperture in the adjacent end of the respective support member.

To complete a magnetic circuit between the signal poles 29, a field ring 36 is press fit into a recess in the inner face of the front cover 6 and is disposed between the pole support members 34 and the front cover 6. Therefore, when the pole support member set screws, not shown, are drawn up, the pole support members 34 are brought into contact with the field ring 36 and two parallel magnetic paths 37 and 38 are provided between the pole members. The front cover 6 is formed of any suitable non-magnetic material such that the signal flux path is independent of the main flux path outside of the rotor 15.

To note any change in the flux in the signal magnetic circuit or path, a signal winding comprising a pair of series connected coils 39 is wound with one coil on each of the signal poles 29. Any change in the magnetic intensity in the signal path results in a proportionate change in the rate of cross flux linkage during the change in the magnetic intensity and thereby induces a voltage in the signal coils which is proportional to the rate of change.

Any voltage induced in the signal coils 39 results from and during a change in the speed at which the rotor is driven. Thus, as long as the rotor is driven at a constant speed, the induced current flowing therein is constant and the magnetic signal flux is likewise constant. As the magnetic flux is constant, the flux linking the signal coils remains constant and no voltage is induced in the coils. Now, during the period the rotor 15 is accelerated or deaccelerated, the speed at which it cuts the main field changes accordingly and the amplitude of the induced current changes in proportion to the speed. The signal flux, arising as a result of the induced current, changes directly therewith and results in a voltage in the coils 39 which voltage is proportional to the rate of change of flux linkage of the coils; i.e., rate of change of induced current. As the rate of change of current is proportional to the acceleration, the voltage induced in the coils is directly proportional to the acceleration. And, as the torque output of the motor 2 is directly proportional to the acceleration of the rotor 15, the induced voltage in coils 39 is proportional to the torque.

As the signal field or flux is as a rule relatively small, the coils 39 preferably comprise a relatively large number of turns to provide a substantial signal voltage.

As previously noted, Fig. 3 is a developed view of the rotor having the projection of the main pole faces 14 as shown in dotted lines 21 and the theoretically induced current pattern established as a result of the rotor 15 cutting the main field flux, not shown, but which enters the one pole from the upper pole face of Fig. 3 and leaves the other pole from the lower pole face of Fig. 3. The induced current pattern is shown for purposes of illustration in Fig. 3 as comprising a plurality of concentric circulating currents within the rotor. Each circulating current flows laterally and in opposite directions beneath the main field pole tips 12 and then flows between the poles through the enlarged ends 18 and 19 of the rotor 15. Thus, each circulating current is in effect an ampere turn which establishes the cross flux concentrated through the signal poles 29, the projection of the signal pole tips 30 being shown in Fig. 3 by dotted lines 40. In fact, it will be recognized that the current is a single circulating current distributed throughout the rotor and that the individual currents are only for simplification of illustration and description.

As shown in Fig. 5, the main field flux designated generally by arrow 41 and the cross or signal flux designated generally by arrow 42 do not lie on the respective vertical and horizontal axis of a vertical section of the described pole and rotor structure as do the respective main pole tips 12 and signal pole tips 30. The main field flux and the signal flux remain at a right angle to one another and are rotated in the direction the rotor is being driven. This is because of the effects of armature reaction which is inherent in the construction of a salient pole dynamoelectric machine, the tester 1 being generally such a machine.

The signal pole tips 30 are sufficiently large to allow this shifting of the cross flux without appreciably changing the reluctance of the magnetic path for the signal flux.

As illustrated in Fig. 5, because of this rotation of the fields, there are a certain number of circulating currents, desginated by the corresponding dots 43 and crosses 44, which circulating currents encircle the main field pole tips 12. These circulating currents establish a demagnetizing flux, that is, a flux directly opposite to the main field flux. This demagnetizing flux is proportional to the value of the induced current which is in turn proportional to the speed at which the rotor is driven. Consequently, at large motor speeds, the demagnetizing flux reduces the net signal flux and the indicated torque is less than the actual torque.

To reduce the detrimental effect of the demagnetizing flux, a relatively large air gap 45 between the rotor 15 and the main field pole tips 12 is employed and a high magnetomotive force, obtained by either increasing the number of turns in the field windings 16 or increasing the field current, is employed. Thus, the demagnetizing flux path, which also includes the air gap 45, has a high reluctance and the demagnetizing flux is reduced. This gives increased fidelity of the speed torque curve.

The increased air gap 45 also increases the air path in the magnetic path between the magnetic poles of the main flux and the signal flux. This increased distance reduces the effective attraction therebetween and the normal armature reaction is made inappreciable.

In motor testing, the speed-torque characteristic is very important. The previously described apparatus provides a voltage proportional to the torque. To obtain a voltage proportional to the speed of the motor, an alternating current generator 46 is built into the testing unit of the present embodiment of the invention.

The generator 46 illustrated is a three-phase, 6-pole permanent magnet generator having an output armature winding 47 embedded in the inner periphery of a stationary ring-shaped armature 48 which is supported by the rear cover 7. The armature 48 is securely held, concentric with the shaft 17, by a ring-shaped spacing bracket 49 which extends axially inwardly from the rear cover 7. The bracket 49 is pressed into a recess on the inner face of the rear cover 7 and the armature 48 is pressed into a recess formed on the inner circumference of the bracket. A six-pole, permanent magnet stator 50 is secured, as by a press fit, to the shaft 17 in axial alignment with the armature 48. An elevational view of the stator 50 is shown in Fig. 6. A pair of disc-shaped keepers 51 are pressed onto the shaft, one to each side of the rotor. The keepers are formed of a material having a low reluctance and thus reduce the leakage flux between the armature and the stator. This substantially prevents a pulsation of drag torque on the shaft and also eliminates effective linkage of the leakage flux with the signal coils.

The illustrated variety of generator is preferred because it avoids the commutation problem in the conventional tachometer generator with the resulting friction torque and periodic maintenance of brushes and commutator surfaces.

Because the shaft 17, and therefore the stator 50, is driven directly by the motor 2, the voltage output of the generator is directly proportional to the speed of the motor 2.

As shown in Fig. 7, the output of the generator 46 is rectified to provide a D.C. voltage as by a rectifier 52 comprising a plurality of fused junction diodes, not shown, having a high peak inverse voltage. The rectifier output is filtered by a condenser 53, connected across the output of the rectifier 52, to reduce the ripple in a rectified voltage.

To provide a visual trace of speed versus torque, the torque proportional voltage output from the series connected signal coils 39 is connected preferably through a conventional filter 54, in circuit with the Y-axis deflector plates 55 of an oscilloscope 56 and the speed proportion voltage output from the rectifier 52 is connected in circuit with the X-axis deflection plates 57 of the oscilloscope through amplifiers 58 and 59, respectively. The latter are a standard part of the oscilloscope. Consequently, the electron stream 60 from the cathode 61 is deflected in accordance with the respective voltage outputs and provides a visual trace on the oscilloscope face or screen 62 of the speed versus the torque.

The filter 54 is illustrated as a conventional capacitor input filter and filters out substantially all of the interference voltages, as hereinafter described.

As shown in Figure 1, the coupling 3 between the tester 1 and the motor 2 is a semi-flexible coupling and allows for misalignment of the motor shaft 63 and the generator shaft 17 while maintaining a rigid connection in torsion. The coupling comprises a sleeve 64 which slides over the tester shaft 17 and is secured thereto by a key 65. A cross bar 66 is secured to the outer periphery of the sleeve 64 in any suitable manner and extends radially to either side thereof to the outer periphery of a balance ring 67 to which it is secured as by welds 68. The cross bar 66 and ring 67 are connected in spaced axial relation to a flexible ring 69 by a pair of diametrically oppositely disposed bolts 70 of which only one is shown. The bolts 70 extend through suitable openings in the flexible ring 69 and thread into aligned and tapped openings in the ring 67 and cross bar 66. A spacer 71 encircles each of the bolts 70 to maintain the axial spacing. The flexible ring 69 is also secured to a rigid ring 72 by a pair of bolts 73 which extend through suitable openings in the flexible ring 69, rotated 90 degrees from bolts 70, and thread into aligned, tapped openings in the rigid ring 72. Spacing members 74 encircle the bolts 73. The rigid ring 72 is, in turn, secured in spaced axial relation to a second flexible ring 75 by a pair of bolts 76 of which only one is shown, in the same manner as the attachment of the first flexible ring 69, with suitable spacing members 77 encircling bolts 76. The second flexible ring 75 is also attached to a flywheel 78 by a pair of bolts 79 which extend through suitable openings in the second flexible ring 75 and thread into aligned openings in the flywheel 78.

Spacers 80 which encircle the respective bolts 79 are of an insulating material and an insulating washer 81 is disposed between each flexible ring 75 and the head of the bolt 79. The openings through which the bolts 79 extend are enlarged to provide a clearance 82 adjacent the respective bolts 79 and thereby insulate the ring from the flywheel. This prevents circulation of shaft currents from the motor to the testing unit which might damage the normal bearings.

The flywheel 78 is a solid, disc-shaped member which is centrally apertured to receive a hub 83 and is provided with a ring-shaped, axially-extended, supplemental-weight support 84 secured to its outer circumference.

The support 84 is provided on its outer circumference with a recess 85 adjacent one axial edge. A plurality of annular supplemental weights 86 are provided, the internal diameter of the first weight generally complementing the external diameter of the support 84 and the internal diameter of each succeeding weight complementing the external diameter of the immediately preceding weight. The external circumference of each weight is provided with a recess 87 similar to that formed on the support 98. The internal circumference of each weight is provided with a depending flange 88 which is adapted to mate with the immediately adjacent recess 103 on the external circumference of the support or supplemental weights.

The first weight 86 is bound to the support 84 and succeeding weights 86 are bound to the preceding weight by a bolt 89 threading into a suitably tapped opening in the face of the weight opposite depending flange 88. The head of the bolt 89 bears against a washer 90 and draws the depending flange 88 into the recess 85 to clamp the weight into position.

A tubular shell 91 encloses the coupling and the weights 84 rest thereon when not secured to the flywheel 88. The supplemental weights 86 are employed to limit the frequency range of the acceleration signal for the motor 1, under test, to below the cutoff frequency of the filter 54. The interference voltages arise from various sources such as mechanical oscillations due to coupling, bearing noise and motor vibration, and surrounding electrical equipment and sources which establish spurious high frequency signals. The interference voltages are of a relatively high frequency and the filter 54 passes substantially all of the information voltage signals and blocks the interference voltage signals as more fully described in the copending application of Alex Paalu, entitled, "Speed and Acceleration Detection of a Rotating Shaft," Serial No. 583,959, filed May 10, 1956 and assigned to a common assignee with this application.

The hub 83 is secured within the center of an attachment plate 92 which is provided with a plurality of wing headed bolts 93. The latter extend through the plate 92 and thread into tapped openings in the flywheel 78 to removably secure the hub 83 to the flywheel. Therefore, a variety of coupling hubs 83 can be provided for various types of motor shafts 63. Thus, the illustrated hub 83 is internally threaded to receive a shaft having its ends correspondingly threaded.

A curve 94 illustrated in Fig. 8 is the speed versus torque characteristic of a dual voltage, single phase motor. A torque dip 95 in the initial portion of the curve indicates a lack of skew of the rotor bars. A second torque dip 96 in the central portion of curve 94 indicates a second harmonic generated by unequal magnetomotive forces on the north and south poles of the motor. These unequal forces arise only on the high voltage connection and are caused by the normal connection of the starting winding across either but not both portions of the running winding, which is wound on the respective north and south poles. A third torque dip 97 in the trailing portion of the curve indicates the disconnection of the starting winding from the circuit.

The operation of the apparatus is described as follows:

Assume it is desired to determine the speed-torque characteristics of a series of motors coming to a testing station from a production line.

The inertia of the flywheel 78 is adjusted depending on the physical size of the motors to be tested to limit the acceleration of the rotor 15 when the motors are attached thereto.

As each motor reaches the testing station, its shaft is inserted in the hub 83 to securely couple the motor to the shaft 17. The motor is energized and accelerates to running speed.

While the motor is accelerating, it accelerates the shaft 17 correspondingly and in accordance with the acceleration, the rotor 15 cuts the magnetic field set up by coils 16. This action results in a longitudinal current flow in the rotor 15 under the pole tips 12 which completes its circular path through the enlarged end portions 18 and 19 of the rotor as shown in Fig. 3. A signal magnetic field directed at substantially ninety degrees to the main magnetic field results from this induced current and is concentrated in the signal circuit including the signal poles 29, the support members 34 and the magnetic ring 36. The rotor 15 accelerates in synchronism with the motor and the signal flux varies directly with the change in speed. As the signal flux changes, the flux linkage with the signal coils 39 changes and induces a voltage in the signal coils which is directly proportional to the rate of change of flux linkage. But, since the signal flux is directly proportional to the speed of the rotor 15, the rate of change of flux linkage is the same as the rate of changes in rotor speed; i.e., the rotor acceleration. And, the torque is proportional to the rotor acceleration so that the voltage from the signal coils 39 is proportional to the rotor torque. This signal voltage from the coils deflects the electron beam 60 in vertical direction to indicate changes in the torque.

The output of the speed generator 46 as rectified by rectifier 52 is directly proportional to the speed of the shaft 17 which is the same as the motor 2, under test. This voltage deflects the electron beam 60 in a horizontal direction in synchronism with the vertical deflection by the voltage of signal coils 39 and thereby traces the speed and torque characteristic of the motor under test.

The resulting curve is compared for example with a standard curve from which a defect in the motor, under test, may be located.

Although the embodiment of the invention, as illustrated, employs field coils 16 to set up the main magnetic field, any other magnetomotive source may be employed to set up the main field. For example, instead of the coils 16, permanent magnets may be used.

Referring to Fig. 9, a permanent magnet pole structure is illustrated which includes a non-magnetic cylindrical shank 98 which is threaded on each end. The shank 98 extends through an aperture in a magnetic frame 99, threads into a pole tip 100 at one end and is secured in position at the opposite end by a nut 101 threaded thereon. Surrounding the shank 98 between the pole tip 100 and the inner circumference of the frame is a permanent magnet 102, a fiber filler 103, and a magnetic support and circuit member 104. The permanent magnet 102 establishes a main flux field between the pole tip 100 and an oppositely disposed tip, not shown. The magnetic member 104 connects the frame 99 in a magnetic return path for the main flux through the fiber filler 103 which is equivalent to an air gap to the magnetic flux. The fiber filler 103 comprises a plurality of individual flat annular discs to permit varying of the size of the air gap.

A similar pole structure employing a permanent magnet is disposed opposite to the preceding structure and the balance of the structure is the same as the first embodiment, previously described.

With the air gap formed by filler 103 in the magnetic circuit, a small air gap between a rotor 105 and the field pole tip 100 is permissible. This appears to permit a somewhat more optimum current pattern in the rotor.

Although the use of permanent magnets are naturally restricted to available materials and therefore impose a limit on the ampere turns for which the main field can be designed, for most if not all practical applications the use of permanent magnets is entirely satisfactory. Advantages of the permanent magnet construction are portability and low initial cost. Further, the use of a permanent magnet field decreases the maintenance cost of the unit and eliminates the necessity for a direct current field source.

The present invention provides apparatus for the determination of the acceleration and thereby the torque of a rotating shaft directly without the usual electronic differentiation and amplification. The speed-torque tester or similar apparatus is consequently simple and inexpensive.

Various modes of carrying out the invention are contemplated as being within the scope of the following claims particularly pointing out and distinctly claiming the subject matter which is regarded as the invention.

I claim:

1. Apparatus for determining the acceleration of a rotating shaft, which comprises means to establish a unidirectional magnetic field, a tubular rotor adapted to be rotated within the field in synchronism with said rotating shaft to establish a signal magnetic field at substantially ninety degrees to the first named magnetic field, a stationary magnetic core secured within said rotor in slightly spaced relation to the rotor, and means responsive to variations in the signal field to detect the acceleration of the rotating shaft.

2. A device for determining the acceleration of a rotating shaft, which comprises a means to establish magnetic field, a tubular rotor adapted to be rotated within the field, means to connect the rotor to the shaft to drive the rotor in synchronism with the shaft and thereby set up a current flow in said rotor, said current flow creating a magnetic field at right angles to the first named magnetic field, stationary core means separate from said rotor and disposed within the tubular rotor and in substantially uniformly spaced relation from the rotor to concentrate the magnetic field through said rotor, a magnetic path for said second named magnetic field independent externally of the rotor of the first named magnetic field, and means responsive to the rate of change of the flux in the second named magnetic field to provide a signal proportional to the acceleration force of the rotating shaft.

3. A device for determining the acceleration torque of a rotating shaft which comprises a main magnetic circuit having a pair of spaced magnetic pole members adapted to establish a magnetic field therebetween, a tubular rotor rotatably mounted within the magnetic field between the pole members and transversely thereto to set up a current flow in the rotor when driven in the field, said rotor being mounted to establish a relatively substantial air gap between the rotor and the pole members, a stationary core member disposed within the rotor to concentrate the magnetic field from the pole members through the rotor, said established current in the rotor creating at ninety degrees to the first named field a signal field which is directly proportional to the speed of the rotor, a magnetic return path for the signal field and independent of the main magnetic circuit, and signal means responsive to a rate of change of a magnetic field, said signal means having means disposed within the signal field to provide a signal in accordance with the rate of change of the signal field.

4. In a testing apparatus for determining the acceleration of rotating equipment, a means to establish constant magnetic field set up between a pair of magnetic poles, a tubular member disposed within said field and adapted to be driven by the rotating equipment, a stationary core member disposed within the tubular member to complete the magnetic path between the poles of the magnetic field, said tubular member being of a low electrical resistance whereby a circulating current is set up therein as the member rotates through the magnetic field, said circulating current creating a signal magnetic flux proportional to the circulating current and proportional to the permeance of its path, a magnetic circuit forming a path for the flux created by the circulating current, and a coil having a large number of turns and being wound on the magnetic circuit to provide a voltage proportional to the rate of change of the signal flux.

5. A device for determination of the acceleration characteristic of rotating equipment, having in combination a concentrated magnetic north pole, a concentrated magnetic south pole, a yoke member connected with the north pole core and the south pole core to provide a return magnetic path therebetween, a stationary cylindrical core of a high permeability centrally disposed between said north and south pole cores with an air gap therebetween, a tubular member rotatably disposed within the aid gap and adapted to be connected with the rotating equipment to be tested, a pair of magnetic pick up members disposed one to each side of the tubular member and displaced substantially ninety degrees from the north and south pole cores, a magnetic yoke connected to each of the pickup members and being separate and independent of the first named magnetic path, and a coil wound on said magnetic yoke and so constructed and arranged as to have changes in the signal flux effect a change in the linkage of the coil to induce a voltage proportional to the rate of change of such flux linkage.

6. The device of claim 5 having a winding operatively associated with said poles and said first named yoke member and adapted to set up a magnetic flux directed from said north pole core to said south pole core through the stationary cylindrical core.

7. A speed-torque tester adapted to be connected to a voltage responsive means having a speed input and an acceleration input to establish a trace of the speed vs. torque for a dynamoelectric machine operating as a motor, which comprises a stationary field structure including a north pole and a south pole joined by an annular magnetic yoke frame and a field winding to set up a high intensity magnetic field between the poles, a front cover secured to one end of the frame, said cover being of an electrically insulating material, a back cover secured to the opposite end of the frame, a stationary cylindrical core disposed between the poles with a small air gap therebetween to concentrate the magnetic field in the air gap, a tubular rotor disposed within the air gap, a shaft journaled within the front and back cover, an insulating member secured to the rotor and to the shaft to rotatably support the rotor, a pair of signal poles disposed one to each side of the rotor and at substantially ninety degrees from the first named north and south poles, a magnetic ring connected to the front cover, and magnetic yoke members connected to said ring and to said signal poles to complete a magnetic signal path, signal windings on said signal path to provide a voltage proportional to the rate of change of magnetic flux in said signal path and adapted to be connected to the acceleration input of said voltage responsive means, a generator stator assembly secured to the back cover and concentrically disposed about the shaft, a rotor assembly secured to the shaft and aligned with the stator assembly to form a generator, the output of generator being proportional to the speed of the shaft adapted to be connected to the speed input of said voltage responsive means, coupling means to connect the shaft to the shaft of the motor to be tested with electrically insulating means to prevent shaft currents from the motor flowing into the speed-torque tester, and means to shield the speed-torque tested from stray magnetic fluxes in said last named means and said motor.

8. In apparatus for determining the acceleration of a rotating shaft, a pair of spaced pole members having circumferentially distributed pole tips, means operatively associated with the pole members to establish a relatively large magnetic field therebetween, a tubular rotor adapted to be rotated within said magnetic field in synchronism with the rotating shaft to establish a signal magnetic field at substantially ninety degrees to the first named magnetic field, said tubular rotor being disposed with a relatively large air gap between the rotor and the pole tips to substantially reduce the demagnetizing flux established by the rotation of the rotor, and a means operatively associated with the signal magnetic field to detect the acceleration of the rotating shaft.

9. A device for determining the acceleration of a rotating shaft, which comprises a magnetic path including a pair of magnetic pole tips disposed in spaced relation, permanent magnetic means associated with said pole tips to establish a unidirectional magnetic field between the pole tips, means providing an air gap in said path adjacent said permanent magnet means, a tubular rotor adapted to be rotated within the magnetic field to establish a magnetic field at substantially ninety degrees to the first named magnetic field, said rotor being disposed with its circumference in close proximity to the adjacent surfaces of the opposed pole tips to provide a small air gap therebetween, and means responsive to variations in the signal field to detect the acceleration of the rotating shaft.

10. Apparatus for determining acceleration of a rotating shaft, which comprises an annular magnetic frame, a pair of rod-shaped non-magnetic supports secured at opposed positions on the frame and extending inwardly toward each other, pole tips secured one each to each of said supports, permanent magnets disposed on said supports immediately adjacent the pole tips, a non-magnetic filler disposed on said supports immediately adjacent said permanent magnets to form a magnetic air gap, a magnetic filler disposed on said supports immediately adjacent the non-magnetic filler and the frame to complete a magnetic path between the pole tips and establish a magnetic field therebetween, a tubular rotor adapted to be rotated in said field in synchronism with the rotating shaft to establish a signal magnetic field at substantially 90° to the first named magnetic field, and means associated with said signal field to detect the acceleration of the rotating shaft.

11. A device for determining the acceleration torque of a rotating shaft which comprises a main magnetic circuit having a pair of spaced main magnetic pole members adapted to establish a magnetic field therebetween, a rotor rotatably mounted within the magnetic field between the pole members and transversely to the magnetic field to set up an induced current flow in the rotor when rotating in the magnetic field, said magnetic pole members having pole faces disposed in slightly spaced relation to said rotor, and substantially encompassing the rotor, said established current in the rotor creating at 90° to the first named field a signal field which is directly proportional to the speed of the rotor, pickup pole members disposed adjacent the rotor between said magnetic pole members and having pole faces of a relatively small circumferential width disposed circumferentially between the main pole members, a magnetic return path linking said signal poles, signal means on said magnetic return path responsive to the rate of change of the magnetic field to establish a signal in accordance with the rate of change of the magnetic field, and means to pick up said signal.

References Cited in the file of this patent
UNITED STATES PATENTS

| | | |
|---|---|---|
| 891,018 | Vawter | June 16, 1908 |
| 2,090,521 | Serrell | Aug. 17, 1937 |
| 2,110,655 | Bancker | Mar. 8, 1938 |
| 2,206,920 | Riggs | July 9, 1940 |
| 2,637,204 | Short | May 5, 1953 |
| 2,674,125 | Eagan | Apr. 6, 1954 |

FOREIGN PATENTS

| | | |
|---|---|---|
| 966,718 | France | May 9, 1950 |

UNITED STATES PATENT OFFICE

CERTIFICATE OF CORRECTION

Patent No. 2,940,038 June 7, 1960

Walter L. Probert

It is hereby certified that error appears in the printed specification of the above numbered patent requiring correction and that the said Letters Patent should read as corrected below.

Column 10, line 2, for "aid" read -- air --.

Signed and sealed this 4th day of April 1961.

(SEAL)
Attest: ERNEST W. SWIDER
Attesting Officer

ARTHUR W. CROCKER
Acting Commissioner of Patents